(12) United States Patent
Mills

(10) Patent No.: US 10,828,982 B2
(45) Date of Patent: Nov. 10, 2020

(54) ELECTRONIC VENTING IN A SADDLE FUEL TANK

(71) Applicant: Eaton Corporation, Cleveland, OH (US)

(72) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 177 days.

(21) Appl. No.: 15/782,302

(22) Filed: Oct. 12, 2017

(65) Prior Publication Data

US 2018/0029468 A1    Feb. 1, 2018

Related U.S. Application Data

(63) Continuation of application No. PCT/US2016/027226, filed on Apr. 13, 2016.
(Continued)

(51) Int. Cl.
*B60K 15/03* (2006.01)
*B60K 15/035* (2006.01)
(Continued)

(52) U.S. Cl.
CPC ...... *B60K 15/03519* (2013.01); *B60K 15/035* (2013.01); *F02M 37/0094* (2013.01);
(Continued)

(58) Field of Classification Search
CPC .... B60K 15/03519; B60K 2015/03118; B60K 2015/03276; B60K 2015/03302;
(Continued)

(56) References Cited

U.S. PATENT DOCUMENTS 5,054,528 A   10/1991  Saitoh
5,392,804 A    2/1995  Kondo et al.
(Continued)

FOREIGN PATENT DOCUMENTS

EP    1967404 A1   9/2008
WO  2015020795 A1  2/2015
WO  2017046242 A1  3/2017

OTHER PUBLICATIONS

European Search Report for EP Application No. 16780596.9 dated Jan. 3, 2019, 9 pages.
(Continued)

*Primary Examiner* — Craig J Price
(74) *Attorney, Agent, or Firm* — RMCK Law Group PLC

(57) ABSTRACT

A fuel tank system constructed in accordance to one example of the present disclosure includes a saddle fuel tank, a control module, a first and second solenoid, and a first and second vent line. The saddle fuel tank can have a first lobe and a second lobe. The first vent line can have a first vent port located in the first lobe of the saddle fuel tank. The first solenoid is configured to open and close the first vent port. The second vent line can have a second vent port located in the second lobe of the saddle fuel tank. The second solenoid is configured to open and close the second vent port. The control module sends a signal to the first and second solenoids to close the first and second vents upon reaching a full fuel condition.

10 Claims, 3 Drawing Sheets

Related U.S. Application Data

(60) Provisional application No. 62/146,660, filed on Apr. 13, 2015, provisional application No. 62/161,339, filed on May 14, 2015.

(51) Int. Cl.
  *F16K 31/524* (2006.01)
  *F02M 37/00* (2006.01)
  *F16K 31/06* (2006.01)
  *F02M 25/08* (2006.01)

(52) U.S. Cl.
  CPC .... *F16K 31/0651* (2013.01); *F16K 31/52408* (2013.01); *F16K 31/52416* (2013.01); *B60K 2015/0319* (2013.01); *B60K 2015/03118* (2013.01); *B60K 2015/03217* (2013.01); *B60K 2015/03223* (2013.01); *B60K 2015/03276* (2013.01); *B60K 2015/03302* (2013.01); *B60K 2015/03533* (2013.01); *B60K 2015/03561* (2013.01); *B60K 2015/03566* (2013.01); *F02M 2025/0863* (2013.01); *Y10T 137/7761* (2015.04); *Y10T 137/86212* (2015.04)

(58) Field of Classification Search
  CPC .... B60K 2015/03533; B60K 15/03504; B60K 2015/03509; B60K 2015/03571; B60K 2015/03576; F02M 2025/0863; F02M 37/0094; F02M 55/004; F02M 55/007; F02M 25/0836; F02M 25/0872; F02M 25/0809; F02M 25/089; F02M 37/0017; F16K 31/52408; F16K 31/52416; F02D 41/004; Y10T 137/053; Y10T 137/0874; Y10T 137/2842; Y10T 137/2849; Y10T 137/309; Y10T 137/3099; Y10T 137/7297; Y10T 137/86075; Y10T 137/86212; Y10T 137/86324; Y10T 137/86332; Y10T 137/8634; Y10T 137/87249; Y10T 137/7761
  USPC .... 123/198 D, 516–521; 137/15.26, 43, 142, 137/143, 199, 202, 389, 574, 587–589, 137/597, 565.22; 141/59, 94, 95, 286, 141/301; 220/4.14, 746
  See application file for complete search history.

(56) References Cited

U.S. PATENT DOCUMENTS

| | | | |
|---|---|---|---|
| 6,382,225 B1 * | 5/2002 | Tipton | B60K 15/00 |
| | | | 123/514 |
| 6,604,539 B1 | 8/2003 | Strohmayer et al. | |
| 7,121,301 B2 | 10/2006 | Krogull et al. | |
| 8,584,704 B2 | 11/2013 | Pifer et al. | |
| 10,400,713 B2 * | 9/2019 | Mills | F02D 41/004 |
| 2004/0256006 A1 | 12/2004 | Aschoff et al. | |
| 2005/0016625 A1 | 1/2005 | Aschoff et al. | |
| 2005/0039728 A1 | 2/2005 | Krogull et al. | |
| 2013/0160877 A1 | 6/2013 | Walter et al. | |
| 2015/0104338 A1 * | 4/2015 | Mueller | F04B 17/048 |
| | | | 417/420 |
| 2018/0087475 A1 | 3/2018 | Mills et al. | |

OTHER PUBLICATIONS

International Search Report and Written Opinion for International Application No. PCT/US2016/027226 dated Jul. 20, 2016, 15 pages.

* cited by examiner

ELECTRONIC VENTING IN A SADDLE FUEL TANK

CROSS-REFERENCE TO RELATED APPLICATIONS

This application is a continuation of International Application No. PCT/US2016/027226 filed Apr. 13, 2016, which claims the benefit of U.S. Patent Application No. 62/146,660 filed on Apr. 13, 2015; and U.S. Patent Application No. 62/161,339 filed on May 14, 2015. The disclosures of the above applications are incorporated herein by reference.

FIELD

The present disclosure relates generally to fuel tanks on passenger vehicles and more particularly to a fuel tank that allows proper venting in a saddle fuel tank.

BACKGROUND

Proper venting and handling of fuel and fuel vapor is required for fuel tanks. More particularly, fuel tanks must be properly vented for passenger motor vehicles. Furthermore, fuel tanks must properly account for containment of liquid fuel. A fuel tank having a saddle geometry can present challenges for proper venting. Saddle fuel tanks are popular among all-wheel-drive powertrain configurations. A saddle tank has two independent lobes often filled with fuel to different heights in different scenarios. In some examples, the geometry of the saddle tank can cause the fuel tank to incorrectly assume a full fuel condition based on fuel level interaction with existing shut-off valve configurations. While current offerings are satisfactory it would be desirable to provide a system on a saddle fuel tank that vents independently of the volume in either lobe while still accurately determining the total fuel volume in the entire fuel tank.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fuel tank system constructed in accordance to one example of the present disclosure includes a saddle fuel tank, a control module, a first and second solenoid, and a first and second vent line. The saddle fuel tank can have a first lobe and a second lobe. The first vent line can have a first vent port located in the first lobe of the saddle fuel tank. The first solenoid is configured to open and close the first vent port. The second vent line can have a second vent port located in the second lobe of the saddle fuel tank. The second solenoid is configured to open and close the second vent port. The control module sends a signal to the first and second solenoids to close the first and second vents upon reaching a full fuel condition.

According to other features, the first and second vent ports are positioned near a top portion of the saddle fuel tank. The saddle fuel tank can further include a recessed central portion intermediate the first and second lobes. The top portion of the saddle fuel tank can be located above the recessed central portion. The control module can be positioned intermediate the first and second vent ports on the saddle tank. The fuel tank system can further include a liquid trap. The first and second vent lines can be routed between the first and second vent ports and the liquid trap.

According to additional features, the liquid trap can include a venturi jet that drains liquid by way of a vacuum out of the liquid trap. The liquid trap can further include a solenoid pump that drains liquid out of the liquid trap. The control module can send a signal to the first and second solenoids to concurrently close the first and second vents upon reaching a full fuel condition. A fuel level sensor can communicate to the control module a signal corresponding to the full fuel condition. The fuel level sensor can include a first fuel level sensor disposed in the first lobe and a second fuel level sensor disposed in the second lobe. The fuel tank system can additionally include a mechanical liquid vapor discriminating (LVD) valve disposed at the liquid trap. The LVD valve can have a membrane filer configured to prevent passage of liquid through the membrane and allow passage of at least one of air and fuel vapor through the membrane.

A fuel tank system constructed accordance to additional features of the present disclosure includes a saddle fuel tank, a control module and a venting assembly. The saddle fuel tank has a first lobe and a second lobe extending on opposite ends of a recessed central portion. The venting assembly includes a first vent line, a second vent line, a first solenoid and a second solenoid. The first vent line has a first vent port located in the first lobe of the saddle fuel tank near a top portion of the saddle fuel tank above the recessed central portion. The second vent line has a second vent port located in the second lobe of the saddle fuel tank near a top portion of the saddle fuel tank above the recessed central portion. The first solenoid can be configured to open and close the first vent port. The second solenoid can be configured to open and close the second vent port. The control module can send a signal to the first and second solenoids to close the first and second vents upon reaching a full fuel condition.

According to additional features, the control module can be positioned intermediate the first and second vent ports on the saddle tank. The fuel tank system can further comprise a liquid trap. The first and second vent lines can be routed between the respective first and second vent ports and the liquid trap. The liquid trap can include a venturi jet that drains liquid by way of a vacuum out of the liquid trap. The liquid trap can include a solenoid pump that drains liquid out of the liquid trap. The control module can send a signal to the first and second solenoids to concurrently close the first and second vents upon reaching a full fuel condition. A fuel level sensor can communicate to the control module a signal corresponding to the full fuel condition.

A fuel tank system constructed in accordance to additional features of the present disclosure can include a saddle fuel tank, a control module and a venting assembly. The saddle fuel tank can have a first lobe and a second lobe extending on opposite ends of a recessed central portion. The venting assembly can include a first vent line, a second vent line and a rotary actuator. The first vent line can have a first vent port located in the first lobe of the saddle fuel tank near a top portion of the saddle fuel tank above the recessed central portion. The second vent line can have a second vent port located in the second lobe of the saddle fuel tank near a top portion of the saddle fuel tank above the recessed central portion. The rotary actuator can be configured to rotate a cam, the cam selectively translating a first valve configured to open and close the first vent line and a second valve configured to open and close the second vent line. The control module can send a signal to the rotary actuator to rotate the cam and therefore close the first and second vent lines with the respective first and second valves upon reaching a full fuel condition. The cam can be configured to concurrently close the first and second valves.

BRIEF DESCRIPTION OF THE DRAWINGS

The present disclosure will become more fully understood from the detailed description and the accompanying drawings, wherein.

DETAILED DESCRIPTION

Figure 2:
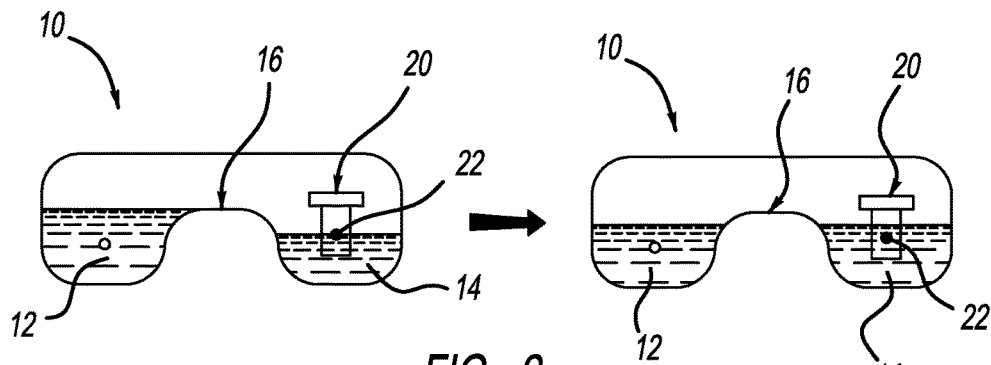
FIG. 2 is a schematic illustration of a saddle fuel tank constructed in accordance to one example of prior art.

With initial reference now to FIG. 2, a fuel tank constructed in accordance to one example of prior art is shown and generally identified at reference 10. Fuel tank 10 is a saddle fuel tank having a first lobe 12 and a second lobe 14. The first lobe 12 is configured as a fuel inlet side. During a refueling event, the fuel is filled into the first lobe 12 before reaching a spillover point 16 where it spills or cascades into the second lobe 14. The second lobe 14 includes a fuel limit vent valve (FLVV) 20 having a shut off point 22. The FLVV 20 controls the shut off point of fuel during refueling based on a relationship between the level of fuel and the shut off point 22. The second lobe 14 is where the fuel tank 10 controls the shut-off height of the fuel during refueling. However, in some instances after shut-off the first lobe 12 and the second lobe 14 can have unequal fuel heights.

Figure 3:
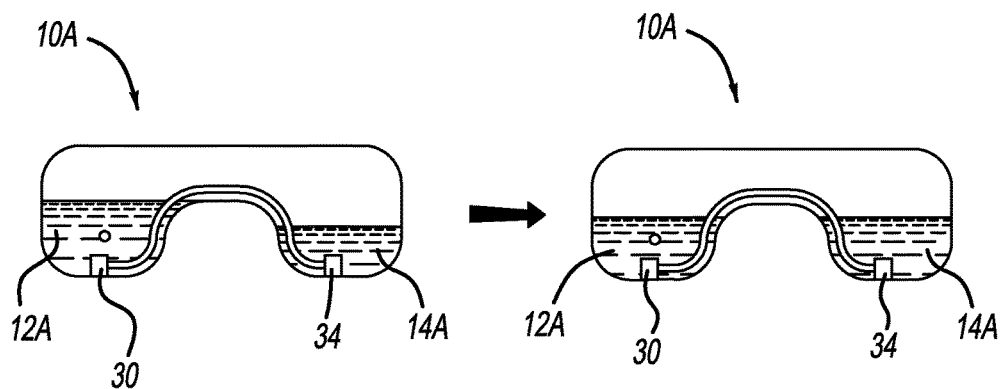
FIG. 3 is a schematic illustration of a saddle fuel tank constructed in accordance to another example of prior art.

As shown in FIG. 3, a fuel tank 10A includes a venturi or slave pump 30. The slave pump 30 can be incorporated in the first lobe 12A to pump fuel from the first lobe 12A to the second lobe 14A. The second lobe 14A includes a fuel pump 34. The slave pump 30 will pump fuel from the first lobe 12A to the second lobe 14A to level out the first and second lobes 12A and 14A. In this regard, the slave pump 30 will operate to keep a similar level of fuel in both of the first and second lobes 12A, 14A. In another configuration, the slave pump 30 may pump fuel from the second lobe 14A to the first lobe 12A. In some scenarios however, the fuel level will then be above the FLVV shut off point 22 (FIG. 2). The shut off point 22 is submerged under fuel. When an amount of fuel is used and a refuel event is desired, the FLVV 20 may still remain shut off even if the tank is less than full. In such a scenario the FLVV 20 has not reopened and therefore no vent pathway is available to allow refueling.

Figure 1:
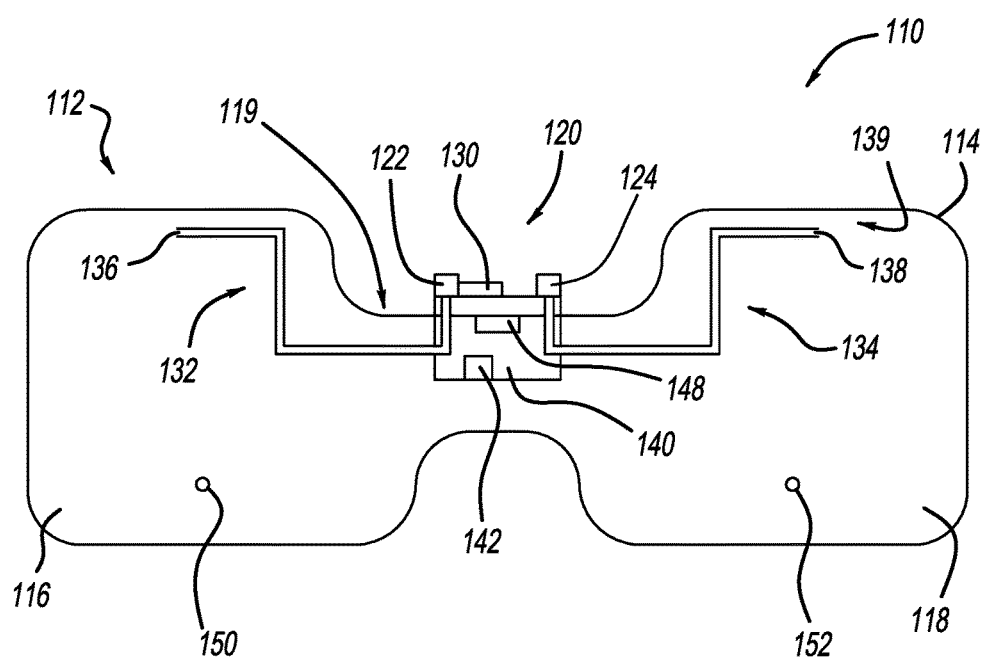
FIG. 1 is a schematic illustration of a saddle fuel tank incorporating an electronic venting system and constructed in accordance to one example of the present disclosure.
Figure 4:
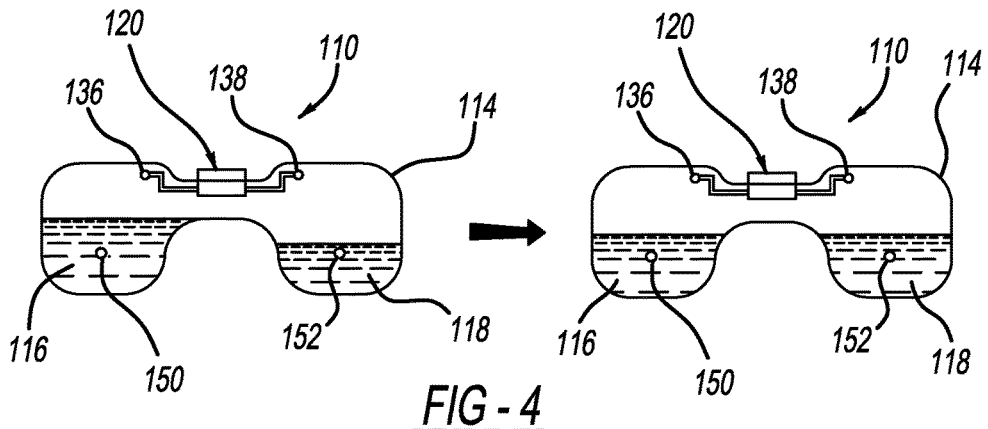
FIG. 4 is a schematic illustration of the fuel tank of FIG. 1.

Turning now to FIGS. 1 and 4, a fuel tank system constructed in accordance to the present disclosure is shown and generally identified at reference numeral 110. The fuel tank system 110 includes an electronic venting system 112 configured on a saddle fuel tank 114. The saddle fuel tank 114 includes a first lobe 116 and a second lobe 118. The first lobe 116 and second lobe 118 can generally define bulbous portions extending on opposite sides of a recessed central portion 119. The electronic venting system 112 can include a solenoid assembly 120 including a first solenoid 122 and a second solenoid 124.

A control module 130 can control the first and second solenoids 122 and 124. The first solenoid 122 is connected to a first vent line 132. The second solenoid 124 is connected to a second vent line 134. The first vent line 132 can terminate at a first vent port 136. The second vent line 134 can terminate at a second vent port 138. The vent ports 136 and 138 are controlled by the first and second solenoids 122 and 124. The vent ports 136 and 138 can be positioned near a top portion 139 of the saddle fuel tank 114. The top portion 139 can be located generally within the respective first and second lobes 116 and 118 above the recessed central portion 119. In this regard, the first and second vent ports 136 and 138 are positioned in the respective first and second vent lobes 116 and 118 above the first and second solenoids 122 and 124 of the saddle fuel tank.

A liquid trap 140 can include a pump 142 such as a venturi pump or jet that drains liquid by way of a vacuum out of the liquid trap 140 when the fuel pump is on. A mechanical liquid vapor discriminating (LVD) valve 148 can be provided at the liquid trap 140. The LVD valve 148 can include a membrane filter positioned in the internal housing cavity between an inlet and an outlet. The membrane filter can be configured to prevent the passage of liquid through the membrane and allow the passage of air and/or fuel vapor through the membrane. The membrane may be a liquid discriminating membrane. In once configuration, the membrane can be configured so that it does not change the hydrocarbon concentration of the air and/or fuel vapor that passes through the membrane. In other configurations, the pump 142 in the liquid trap 140 can be configured as a solenoid pump for clearing the liquid from the liquid trap 140. A first fuel level sensor 150 can be disposed in the first lobe 116. A second level sensor 152 can be disposed in the second lobe 118.

During a refueling event with the fuel tank system 110, when a level sensor 150 or 152 attains a predetermined status, the control module 130 can send a signal to one or both of the first and second solenoids 122 and 124 to close the first and second vent lines 132 and 134 at the respective vent ports 136 and 138. While level sensors 150 and 152 are illustrated, one in each lobe 116 and 118, it will be appreciated that fuel level may be determined and/or communicated to the control module 130 in different ways within the scope of the present disclosure. Once the vent ports 136 and 138 are closed, the venting in the fuel tank 114 shuts off and the refilling fuel nozzle is, in turn, caused to shut off. The solenoids 122 and 124 can close the first and vent lines 132 and 134 concurrently or individually. Because the vent ports 136 and 138 are at an elevated location on the fuel tank 114, they are above the fuel level thus avoiding the limitations described above with respect to the fuel tank 10 (FIGS. 1 and 2). In other words, the level of the liquid in the fuel tank 114 will not interfere with the vent ports 136 and 138. Further, as shown in FIG. 4, the fuel may fill the first lobe 116 and subsequently spill over into the second lobe 118. The venting will be open at the vent ports 136 and 138 allowing fuel filling to continue until reaching a predetermined amount, such as identified by the level sensors 150 and 152. Thus, the configuration of the saddle tank will not have an adverse effect of inadequate venting and possible fuel fill issues.

The electronic venting system 112 provided by the fuel tank system 110 can accurately identify a 100% full fuel condition independent of the fuel height in either of the first and second lobes 116 and 118. In this regard, the fuel tank system 110 can repeatably attain a 100% fill condition as the vent ports 136 and 138 can only be closed based on the status of the first and second solenoids 122 and 124.

Figure 5A:
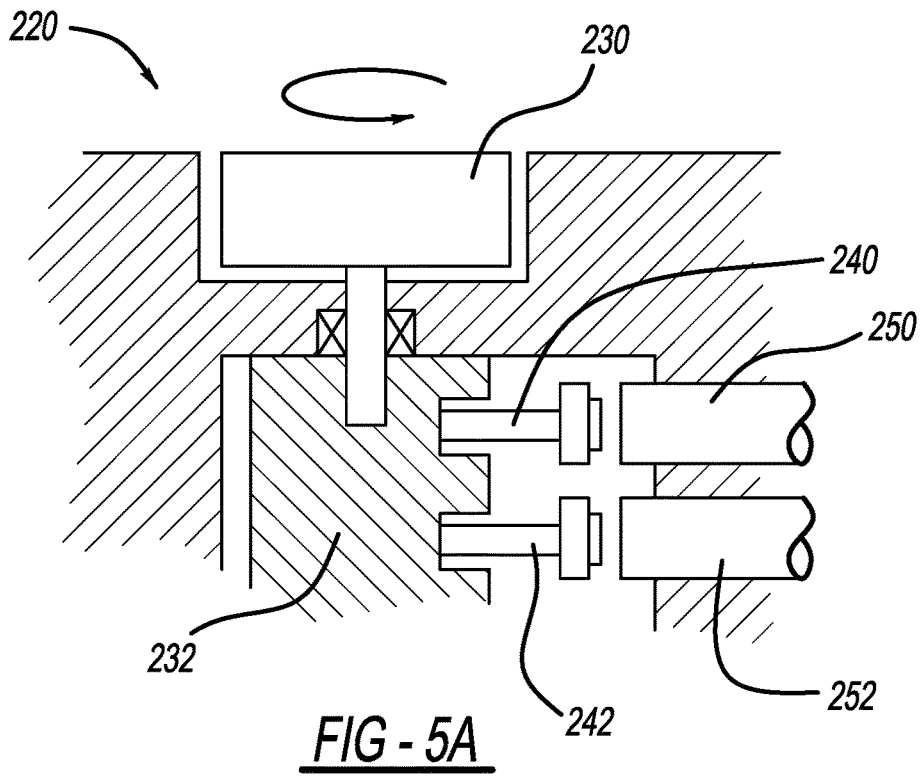
FIG. 5A is a schematic illustration of a cam driven tank venting assembly constructed in accordance to additional features of the present disclosure and shown with the two vents in an open position.
Figure 5B:
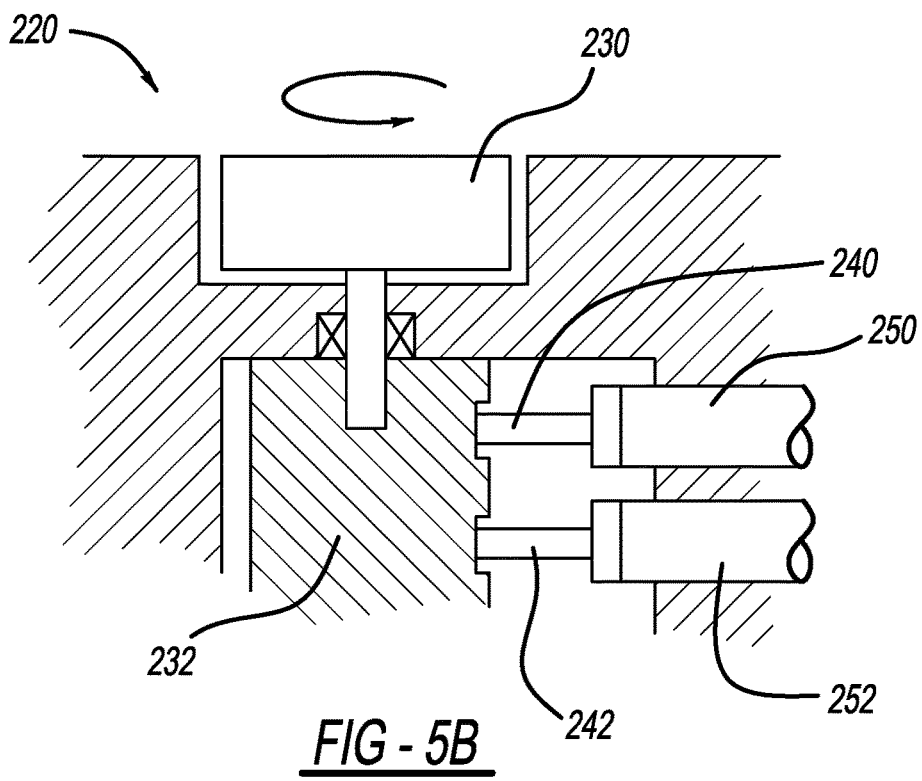
FIG. 5B is a schematic illustration of the cam driven tank venting assembly of FIG. 5A and shown with the two vents in a closed position.

With reference now to FIGS. 5A and 5B, a fuel tank system 210 constructed in accordance to another example of the present disclosure is shown. The fuel tank system 210 can be constructed similarly to the fuel tank system 110 described above except instead of the control module 130 controlling first and second solenoids 122 and 124, the control module 130 communicates with a cam driven tank venting assembly 220. The cam driven tank venting assembly 220 includes one rotary actuator 230 and a cam 232 to selectively open valves 240 and 242. The valves 240 and 242 can be poppet valves that are configured to open and close respective vent lines 250 and 252. The vent lines 250 and 252 can be configured similarly to the first and second vent lines 132 and 134 described above and lead to respective vent ports. The cam 232 can be rotated to a prescribed position where the desired valves 240 and 242 are open or closed. In the example shown, the cam 232 is configured to close both valves 240 and 242 concurrently in FIG. 5B corresponding to a predetermined status being attained by the level sensors 150 and 152. It will be appreciated that the cam 232 can also be configured to close one of the valves 240 and 242 depending upon which lobe requires venting to be closed. The venting configuration provided by the fuel tank system 210 can accurately identify a 100% full fuel condition independent of the fuel height in either of the first and second lobes (116, 118). In this regard, the fuel tank system 210 can repeatably attain a 100% fill condition as the vent ports (136, 138) can only be closed based on the status of the valves 240 and 242.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fuel tank system comprising:
a saddle fuel tank having a first lobe and a second lobe;
a control module;
a first solenoid;
a second solenoid;
a first vent line having a first vent port located in the first lobe of the saddle fuel tank, the first solenoid configured to open and close the first vent port; and
a second vent line having a second vent port located in the second lobe of the saddle fuel tank, the second solenoid configured to open and close the second vent port, wherein the first and second vent ports are positioned in the respective first and second vent lobes above the first and second solenoids of the saddle fuel tank;
wherein the control module sends a signal to the first and second solenoids to close the first and second vents upon reaching a full fuel condition.

2. The fuel tank system of claim 1 wherein the first and second vent ports are positioned near a top portion of the saddle fuel tank.

3. The fuel tank system of claim 1 wherein the saddle fuel tank further includes a recessed central portion intermediate the first and second lobes, wherein the top portion of the saddle fuel tank is located above the recessed central portion.

4. The fuel tank system of claim 3 wherein the control module is positioned intermediate the first and second vent ports on the saddle tank.

5. The fuel tank system of claim 1, further comprising:
a liquid trap, wherein the first and second vent lines are routed between the respective first and second vent ports and the liquid trap.

6. The fuel tank system of claim 5 wherein the liquid trap includes a venturi jet that drains liquid by way of a vacuum out of the liquid trap.

7. The fuel tank system of claim 5 wherein the liquid trap includes a solenoid pump that drains liquid out of the liquid trap.

8. The fuel tank system of claim 1 wherein the control module sends a signal to the first and second solenoids to concurrently close the first and second vents upon reaching a full fuel condition.

9. The fuel tank system of claim 1, further comprising a fuel level sensor that communicates to the control module a signal corresponding to the full fuel condition.

10. The fuel tank system of claim 1, wherein the fuel level sensor comprises a first fuel level sensor disposed in the first lobe and a second fuel level sensor disposed in the second lobe.

* * * * *